(12) United States Patent
Jaffe et al.

(10) Patent No.: US 10,897,440 B1
(45) Date of Patent: Jan. 19, 2021

(54) SYSTEMS AND METHODS FOR INCLUDING PLACEHOLDERS IN MEDIA CONTENT

(71) Applicant: Facebook, Inc., Menlo Park, CA (US)

(72) Inventors: Benjamin Jaffe, Los Gatos, CA (US); Michael O'Brien, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/546,511

(22) Filed: Aug. 21, 2019

(51) Int. Cl.
*H04L 12/58* (2006.01)

(52) U.S. Cl.
CPC .......... *H04L 51/063* (2013.01); *H04L 51/046* (2013.01); *H04L 51/10* (2013.01)

(58) Field of Classification Search
CPC ....... H04L 51/063; H04L 51/10; H04L 51/18; H04L 51/32; G06Q 30/0251; G06Q 30/0276; G06Q 30/0277
See application file for complete search history.

(56) References Cited

U.S. PATENT DOCUMENTS

| 9,286,397 | B1* | 3/2016 | Suleman | G06Q 30/0269 |
| 2006/0150088 | A1* | 7/2006 | Kraft | G06F 40/186 |
| | | | | 715/249 |
| 2006/0184418 | A1* | 8/2006 | Connolly | G06Q 30/0224 |
| | | | | 705/14.67 |
| 2008/0184288 | A1* | 7/2008 | Lipscomb | G06Q 30/02 |
| | | | | 725/32 |
| 2008/0307310 | A1* | 12/2008 | Segal | G06O 30/02 |
| | | | | 715/723 |
| 2010/0023863 | A1* | 1/2010 | Cohen-Martin | G06Q 30/02 |
| | | | | 715/723 |
| 2010/0076851 | A1* | 3/2010 | Jewell, Jr. | G06Q 30/02 |
| | | | | 705/14.67 |
| 2010/0332330 | A1* | 12/2010 | Goel | G06O 30/02 |
| | | | | 705/14.66 |
| 2014/0164147 | A1* | 6/2014 | Jacobson | G06Q 30/0277 |
| | | | | 705/14.73 |

(Continued)

OTHER PUBLICATIONS

Malheiro et al., "Dynamic Personalisation of Media Content", 2011, In Proc. of Sixth International Workshop on Semantic Media Adaptation and Personalization (Year: 2011).*

(Continued)

*Primary Examiner* — Aaron N Strange
(74) *Attorney, Agent, or Firm* — FisherBroyles, LLP

(57) ABSTRACT

The disclosed computer-implemented method may include obtaining an original media data structure that comprises a plurality of layers, determining, for each layer within the plurality of layers, that at least one declarative patch within a plurality of declarative patches is applicable to the layer, generating a modified media data structure that comprises, for each layer determined to have at least one applicable declarative patch, a placeholder and a patcher function associated with the respective at least one declarative patch, rendering the modified media data structure, the rendering comprising, for each layer including a placeholder and a patcher function, executing the patcher function, the executing comprising replacing the placeholder based on user data, and providing, for display on a display device of a computing device of the user, the rendered modified media data structure. Various other methods, systems, and computer-readable media are also disclosed.

20 Claims, 10 Drawing Sheets

(56) References Cited

U.S. PATENT DOCUMENTS

| | | | |
|---|---|---|---|
| 2014/0278786 A1* | 9/2014 | Liu-Qiu-Yan | G06Q 30/0201 |
| | | | 705/7.32 |
| 2019/0019322 A1* | 1/2019 | Sankaran | H04L 51/10 |
| 2019/0124019 A1* | 4/2019 | Leon | G06F 3/04842 |
| 2019/0205929 A1* | 7/2019 | Snibbe | G06N 20/00 |

OTHER PUBLICATIONS

"How to Customize Facebook Reactions with F.B.Purity", URL: https://www.fbpurity.com/customize-facebook-reactions.htm, as accessed on May 29, 2019, pp. 1-3.

* cited by examiner

100

Jane Doe 102   106

We think you will enjoy our event.   112

You have 38 days to sign up.   116

110   108
104

We know that people like you in Brooklyn, New York will have a great time.   114

118
120

SYSTEMS AND METHODS FOR INCLUDING PLACEHOLDERS IN MEDIA CONTENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
FIG. 1 is a block diagram showing a first example of rendered personalized media content.
Figure 1:

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Personalized media content may provide personalized messages to individuals. The personalized media content may be an image or streaming media content such as a video or a video clip. The personalized media content may include content unique to the individual. For example, the personalized media content may include photos or images unique to the individual. In another example, the personalized media content may be customized (personalized) for the individual based on an event occurring in the life of the individual such as a birthday. Creating unique personalized media content for each individual may be challenging as it may involve creating a single unique output of the media content for each individual.

The present disclosure is generally directed to including patches in media content that may act as personal information placeholders that may be augmented or replaced with user content when the media content is rendered. As will be explained in greater detail below, embodiments of the present disclosure may augment or replace patches included in one or more layers of stored media content with personal information of the user when rendering the media content for the user. The patches may allow personalized content of each user to be easily inserted into the rendered media without the need to create and generate a unique media composition of the media content for each individual user. The patches may include declarative patches and/or full patches, each of which will be described in more detail herein.

Personalized media content may be created for a user that includes unique content related to the user (e.g., photos, text, graphics, etc.). The personalized media content may include, but is not limited to, a video, a video clip, a still image, a three-dimensional model (3D model), etc. In some cases, the video and/or the video clip may be streaming media that may include image and audio content. In some cases, the video and/or the video clip may be streaming media that may include image content. Content unique to the user may include, but is not limited to, images, photos, text, graphics, etc. In general, media creation tools may produce unique personalized media content for each rendered media content necessitating the creation of a unique composition for each user. The methods and systems as described herein for augmenting or replacing layers in rendered media with personal information placeholders may allow content of a user to be easily inserted into the rendered media without the need for a unique media composition for each user.

Content of a user may be inserted into the rendered media by augmenting and/or replacing specific layers in the original composition produced by the media creation tool with patches and/or placeholders to create a composition template. When the composition template is rendered for a specific user, the patches and/or placeholders may be replaced with specific content associated with the user. Therefore, a single composition template may be used to generate personalized rendered media for multiple users. Declarative patches may include a library of common patches (e.g., text patches, image patches, reaction patches) that include both the logic for the patch and a placeholder functionality for the patch. Full patches may include a filter function and a patcher function. The filter function may include logic for determining if a patch may even be applicable to a particular layer. If it is determined that the patch may be applicable to the particular layer, the patcher function may (i) augment the layer with a placeholder function, (ii) replace the layer with a placeholder function, (iii) modify the layer to respond to content related to the user, (iv) remove the layer if, for example, necessary data is missing, and/or (v) add other features to the layer such as special keys.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a block diagram showing a first example 100 of rendered personalized media content. For example, the first example 100 may be personalized media content that may be rendered on a display device included in a computing device of a user (e.g., a display device 352 of a computing device 350 as shown with reference to FIG. 3). The first example 100 may be for personalized media content that includes a name of a user (e.g., "Jane Doe") in a first area 102 of a first page or frame 106 of the rendered media content and a picture or other image associated with a user (e.g., a user image 110) in a second area 104 of a second page or frame 108 of the rendered media content. For example, the first area 102 and the second area 104 may each be associated with a respective layer in a composition for the media content.

In some implementations, a composition for media content may be represented using a media data structure for use in rendering the media content. The first area 102 may be associated with a text layer within the original media data structure. The second area 104 may be associated with an image layer within the original media data structure. In addition, or in the alternative, the first page 106 of the rendered personalized media content may include a third area 112 that may include a number of days until the occurrence of an event. The third area 112 may be associated with a date layer within the original media data structure. In addition, or in the alternative, the first page 106 of the rendered personalized media content may include a fifth area 116 that includes the third area 112. The fifth area 116 may also be associated with the date layer. In addition, or in the alternative, the second page 108 of the rendered personalized media content may include a fourth area 114 that may include a current location of a user. The fourth area 114 may be associated with a location layer within the original media data structure. In addition, or in the alternative, a sixth area 118 may be associated with a reactions bar layer within the original media content data structure.

In some implementations, delivering personalized media content for each individual user may involve generating a unique composition for each individual user that includes the user name and the associated user image. In addition, or in the alternative, delivering personalized media content for each individual user may involve generating a unique composition for each individual user that includes information related to and/or associated with the user that may be dependent on relative information or data associated with the user such as a current date or a time (e.g., the third area 112), a current location of the user (e.g., the fourth area 114), and/or common reactions of the user to media content (e.g., the sixth area 118 including a reactions bar 120). In these implementations, the system may be impacted by the overhead associated with the generating and/or storage of each unique composition for each user and the challenges of generating and/or storing each unique composition based on relative information or data associated with the user (e.g., user name, user image, time, date, location, preferred or common user reactions, etc.).

Figure 2:
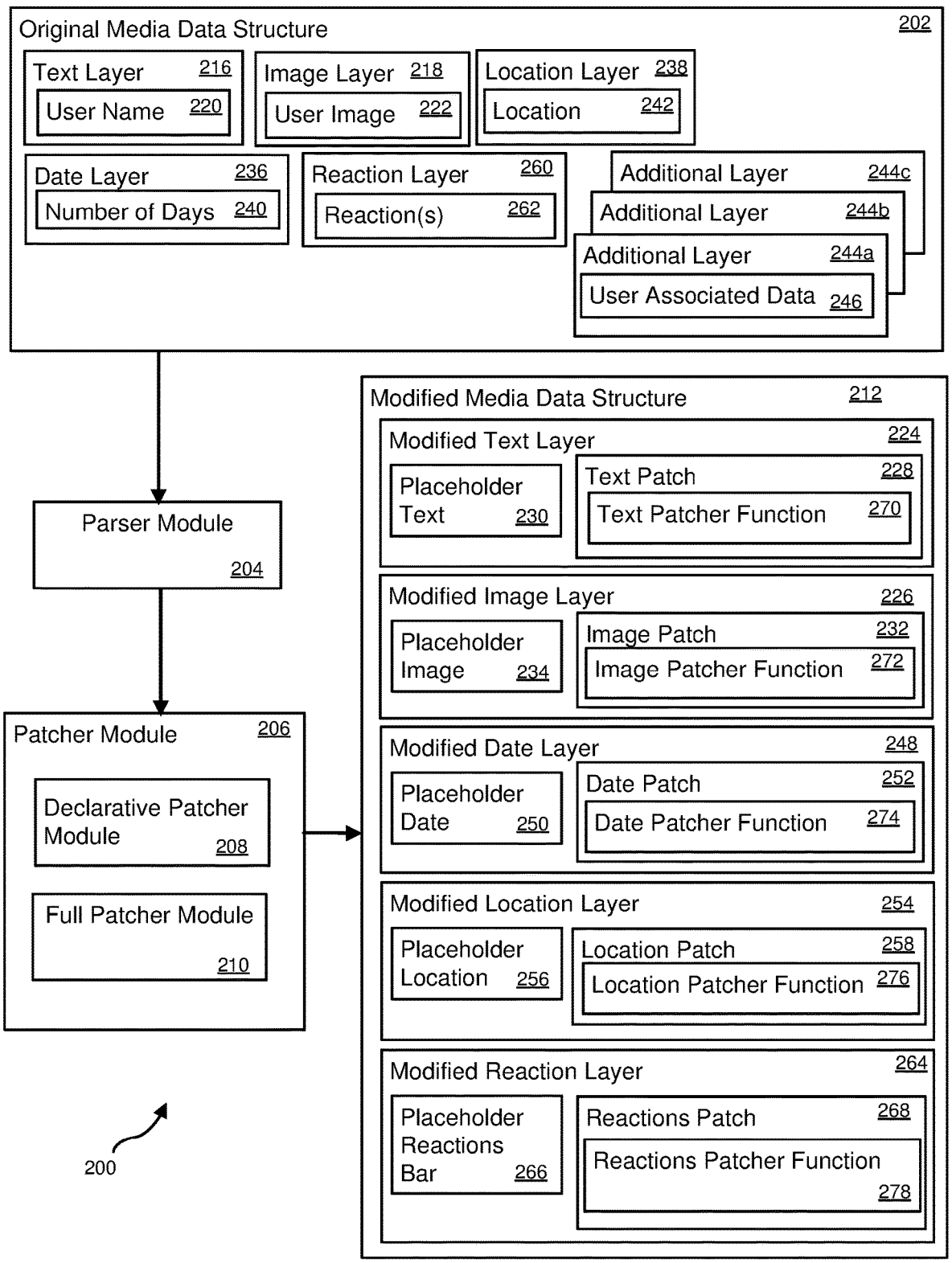
FIG. 2 is a block diagram of an example block flow for generating a modified media data structure file.

FIG. 2 is a block diagram of an example block flow 200 for generating a modified media data structure file. In some implementations, a single modified media structure file may be used when rendering personalized media content for multiple users reducing, if not eliminating, system overhead associated with the generating and/or storing of a unique composition for each individual user.

One or more of the methods and systems described herein may parse the original composition for the media content to identify one or more layers included in the original media data structure for the media content. Referring to FIG. 2, a parser module 204 may receive as input an original media data structure (an original composition) 202. For example, the original media data structure (the original composition) 202 may be a media file that includes multiple layers for use in rendering the media content included in the original composition.

For example, referring to FIG. 1, the original media data structure 202 may include a text layer 216, an image layer 218, a date layer 236, a location layer 238, a reaction layer 260, and one or more additional layers 244a-c. The layers included in the original media data structure 202 of the example block flow 200 may include more layers, less layers, and/or different layers. The text layer 216 may include a user name entry 220. The image layer 218 may include a user image entry 222. The date layer 236 may include a number of days entry 240. The location layer 238 may include a location entry 242. The reaction layer 260 may include a reaction(s) entry 262. Each additional layer 244a-c may include a respective layer for associated user information and/or data. For example, additional layer 244a may include user associated data entry 246.

In some implementations, an original media data structure (e.g., the original media data structure 202) may be created (generated) for each individual user. Referring to the first example 100, an original media data structure may be created for the user "Jane Doe". In this example, the user name entry 220 in the text layer 216 is textual data for "Jane Doe." The user image entry 222 in the image layer 218 is image data for the user image 110. The number of days entry 240 in the date layer 236 may be a number of days from the current date to a future date (e.g., a date for a scheduled event). The location entry 242 in the location layer 238 may be a current location of a user (the user for which the original media data structure may be created (generated) for the individual user). In another example, the location layer 238 may be an address of a user (the user for which the original media data structure may be created (generated) for the individual user). The reaction(s) entry 262 may include one or more reactions for use in rendering a reactions bar (e.g., the reactions bar 120). As described herein, an original media data structure may be created or generated for each individual user slated for delivery of the media content in order to provide each individual user with a personalized version of the media content when rendering the media content.

The parser module 204 may identify the text layer 216 that includes the user name entry 220 for displaying in the first area 102 when the original composition is rendered. In the first example 100, the parser module 204 may identify the image layer 218 that includes information associated with a user (e.g., a user image entry 222) for displaying in the second area 104 when the original composition is rendered. For example, the user image entry 222 may be for an image of a user or for an image associated with a user. The parser module 204 may identify the reaction layer 260 that includes information associated with a user (e.g., reaction(s) entry 262) for displaying in a reactions bar 120 included in the sixth area 118 when the original composition is rendered.

One or more of the methods and systems described herein may modify or augment the original media data structure by including a patch in an identified layer. The patch may include a filter function and/or a patcher function that may be executed when the media data structure is rendered. Referring to FIG. 2, the parser module 204 may identify a text layer (e.g., the text layer 216). The parser module 204 may access a patcher module 206 that may include a declarative patcher module 208 and a full patcher module 210. The declarative patcher module 208 may determine that a declarative patch is available for use with the text layer 216. The patcher module 206 may modify or augment the text layer 216, creating (generating) a modified text layer 224 for including in a modified media data structure 212.

The patcher module 206 may place or include a text declarative patch (e.g., text patch 228) and placeholder text 230 (e.g., a placeholder for a name of a user) in the modified text layer 224.

In addition, or in the alternative, the parser module 204 may identify an image layer (e.g., the image layer 218). The parser module 204 may access the patcher module 206. The declarative patcher module 208 may determine that a declarative patch is available for use with the image layer 218. The patcher module 206 may modify or augment the image layer 218, creating (generating) a modified image layer 226 for including in the modified media data structure 212. The patcher module 206 may place or include an image declarative patch (e.g., image patch 232) and a placeholder image 234 (e.g., a placeholder for an image or other data associated with a user) in the modified image layer 226.

In addition, or in the alternative, the parser module 204 may identify a reaction layer (e.g., the reaction layer 260). The parser module 204 may access the patcher module 206. The declarative patcher module 208 may determine that a declarative patch is available for use with the reaction layer 260. The patcher module 206 may modify or augment the reaction layer 260, creating (generating) a modified reaction layer 264 for including in the modified media data structure 212. The patcher module 206 may place or include a reactions declarative patch (e.g., reactions patch 268) and a placeholder reactions bar 266 in the modified image layer 226. For example, the placeholder reactions bar 266 may be a placeholder for a reactions bar that may include a number of emojis (e.g., zero to three) for placement in a reactions bar (e.g., the reactions bar 120) that are based on information and/or data associated with a user (e.g., user content).

The parser module 204 may identify the date layer 236 that includes the number of days entry 240 for displaying in the third area 112 when the original composition is rendered. In the first example 100, the parser module 204 may identify the location layer 238 that includes information associated with and/or related to a location of a user (e.g., a location entry 242) for displaying in the fourth area 114 when the original composition is rendered.

One or more of the methods and systems described herein may modify or augment the original media data structure by including a patch in an identified layer. The patch may include a filter function and/or a patcher function that may be executed when the media data structure is rendered. Referring to FIG. 2, the parser module 204 may identify a date layer (e.g., the date layer 236). The parser module 204 may access the patcher module 206 that may include the declarative patcher module 208 and the full patcher module 210. The declarative patcher module 208 may determine that a declarative patch is not available for use with the date layer 236. The patcher module 206 may access the full patcher module 210. A date filter function included in the full patcher module 210 may determine that a patch is applicable to the date layer 236. The date filter function may be included in (associated with) a date full layer patch that also includes a date patcher function 274. The date patcher function 274 associated with the full date layer patch may be determined to be available for use with the date layer 236. The patcher module 206 may modify or augment the date layer 236, creating (generating) a modified date layer 248 for including in a modified media data structure 212. The patcher module 206 may place or include a date patch (e.g., date patch 252) and a placeholder date 250 (e.g., a placeholder for the number of days) in the modified date layer 248.

Referring to FIG. 2, the parser module 204 may identify a location layer (e.g., the location layer 238). The parser module 204 may access the patcher module 206 that may include the declarative patcher module 208 and the full patcher module 210. The declarative patcher module 208 may determine that a declarative patch is not available for use with the location layer 238. The patcher module 206 may access the full patcher module 210. A location filter function included in the full patcher module 210 may determine that a patch is applicable to the location layer 238. The location filter function may be included in (associated with) a location full layer patch that also includes a location patcher function 276. The location patcher function 276 associated with the full location layer patch may be determined to be available for use with the location layer 238. The patcher module 206 may modify or augment the location layer 238, creating (generating) a modified location layer 254 for including in a modified media data structure 212. The patcher module 206 may place or include a location patch (e.g., location patch 258) and a placeholder location 256 (e.g., a placeholder for a location of the user) in the modified location layer 254.

In some implementations, the parser module 204 may identify a one or more of the additional layers 244a-c. The parser module 204 may access the patcher module 206 that may include the declarative patcher module 208 and the full patcher module 210. In some implementations, the declarative patcher module 208 may determine that a declarative patch is available for an additional layer. In these implementations, the patcher module 206 may modify or augment the additional layer, creating (generating) a modified additional layer for including in a modified media data structure (e.g., the modified media data structure 212). The patcher module 206 may place or include a declarative patch for the additional layer and a placeholder for information and/or data related to the user in the modified additional layer.

In some implementations, the declarative patcher module 208 may determine that a declarative patch is not available for an additional layer. In these implementations, the patcher module 206 may access the full patcher module 210. A filter function included in the full patcher module 210 may determine that a patch is applicable to the additional layer. The filter function may be included in (associated with) a full layer patch that also includes a patcher function. The patcher function associated with the full layer patch may be determined to be available for use with the additional layer. The patcher module 206 may modify or augment the additional layer, creating (generating) a modified additional layer for including in a modified media data structure (e.g., the modified media data structure 212). The patcher module 206 may place or include a patch for the additional layer and a placeholder for information and/or data related to the user in the modified additional layer.

Figure 3:
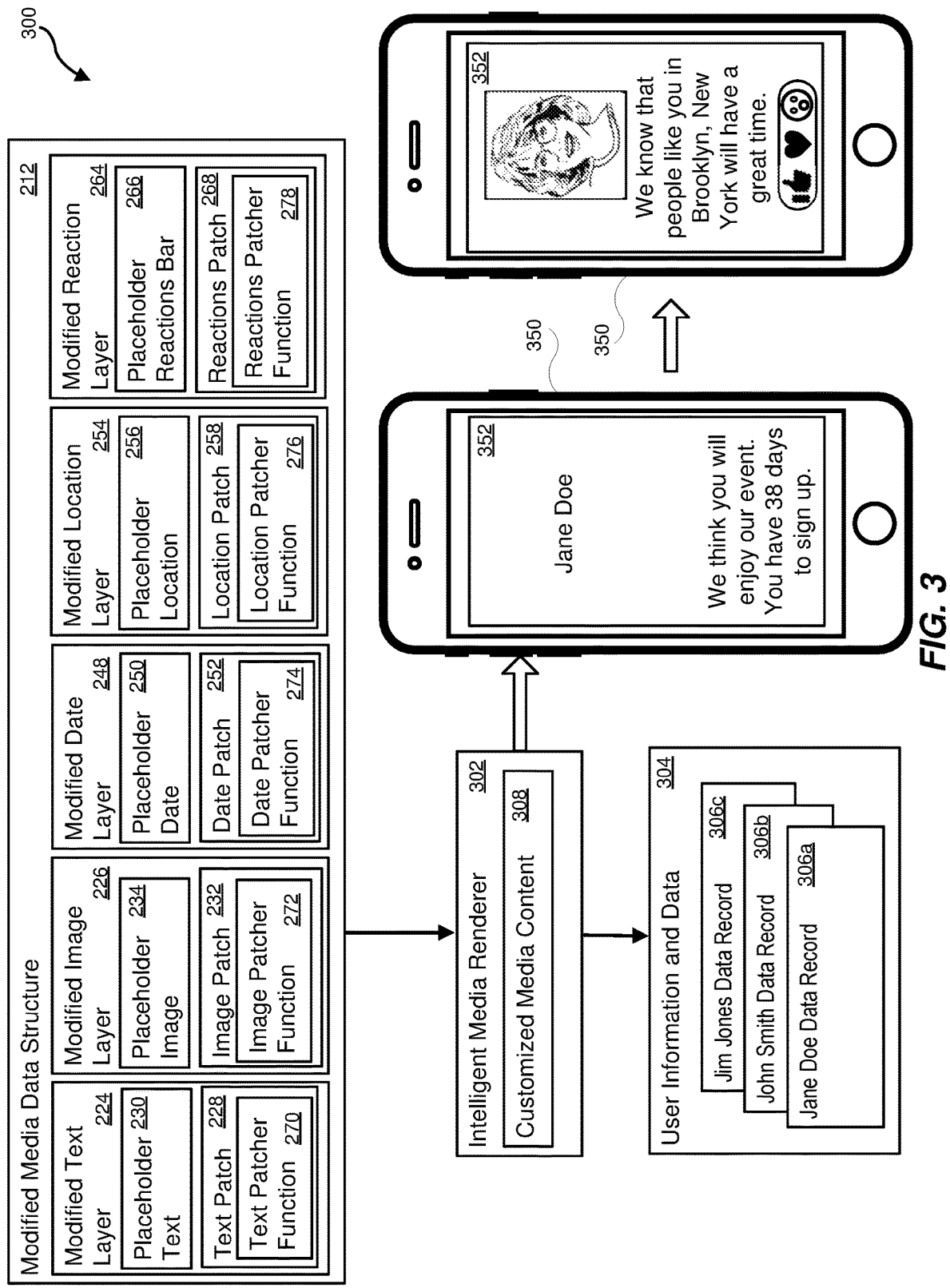
FIG. 3 is a block diagram of an example block flow for rendering a modified media data structure file.

FIG. 3 is a block diagram of an example block flow 300 for rendering a modified media data structure (e.g., the modified media data structure 212). Referring to FIG. 2, an intelligent media renderer 302 may receive the modified media data structure 212. The intelligent media renderer 302 may access (interface with) a user information and data repository 304. The user information and data repository 304 may include one or more data records 306a-c. The intelligent media renderer 302 may use information and/or data associated with a user for use in creating (generating) customized media content 308 for each user for rendering on the display device 352 of the computing device 350.

Though shown as a smartphone, the computing device 350 may represent a client device or a user device, such a desktop computer, laptop computer, tablet device, smartphone, or other computing device that may include at least one processor and at least one memory device.

Referring to FIG. 1 and FIG. 2, the intelligent media renderer 302 when rendering the modified media data structure 212 for a specific user (e.g., Jane Doe) may access the user information and data repository 304, and specifically, may access the data record for (associated with) the specific user (e.g., data record 306a for Jane Doe) when rendering the modified text layer 224 of the modified media data structure 212 for the specific user (e.g., Jane Doe). The intelligent media renderer 302 may access the text patch 228 and execute a text patcher function 270 included in the text patch 228. Executing the text patcher function 270 may replace the placeholder text 230 in the modified text layer 224 with text associated with the specific user. For example, the placeholder text 230 may be for a name of a user. Executing the text patcher function 270 for the specific user (e.g., Jane Doe) replaces the placeholder text 230 with "Jane Doe" (the name of the specific user) when the intelligent media renderer 302 renders the modified data structure 212 as customized media content 308 for display on the display device 352 of the computing device 350 of the specific user (e.g., a computing device of Jane Doe).

In some implementations, the text patcher function 270 may automatically handle text and layout properties for replacement of the placeholder text with text based on user content. The text patcher function 270 may automatically handle the text and layout properties based on a locale. For example, the intelligent media renderer 302 when rendering the modified media data structure 212 for a specific user (e.g., Jane Doe) may access the user information and data repository 304, and specifically, may access the data record for (associated with) the specific user (e.g., data record 306a for Jane Doe) determining a locale of the user. In another example, the intelligent media renderer 302 may determine a locale of the user based on information and/or data included in the computing device 350 of the user. In some cases, a locale of a user may require text alignment in a left-to-right manner (e.g., English) as shown, for example, with reference to FIG. 5. In some cases, a locale of a user may require text alignment in a right-to-left manner (e.g., Arabic, Hebrew) as shown, for example, in FIG. 6.

In some implementations, the text patcher function 270 may automatically handle the text and layout properties based on a size of a text string and a size of an area within the media content. For example, referring to FIG. 1, a size of the text string for a name of a user in a first font and first font size may exceed the size of the first area 102 (e.g., the user name will not fit into the first area 102). In these cases, the name of the user may be truncated when the modified media data structure is rendered. In some implementations, the text patcher function 270 may determine that the size of the text string for the name of the user in the first font and the first font size exceeds the size of the first area 102. In some cases, the text patcher function 270 may alter the size of the first font (e.g., reduce the size of the first font) so that the text string for the name of the user in the first font does not exceed the size of the first area 102 when rendering the modified media content. In some cases, the text patcher function 270 may alter the font used for the text string for the name of the user (e.g., the text string may be rendered in a second font different from the first font) so that the text string for the name of the user in the second font does not exceed the size of the first area 102 when rendering the modified media content. In some cases, the text patcher function 270 may alter both the font and a font size so that the text string for the name of the user does not exceed the size of the first area 102 when rendering the modified media content.

Referring to FIG. 1 and FIG. 2, continuing with the rendering of the modified media data structure 212 for the specific user (e.g., Jane Doe), the intelligent media renderer 302 may continue accessing the data record 306a when rendering the modified image layer 226 of the modified media data structure 212 for the specific user (e.g., Jane Doe). The intelligent media renderer 302 may access the image patch 232 and execute an image patcher function 272 included in the image patch 232. Executing the image patcher function 272 may replace the placeholder image 234 in the modified image layer 226 with an image (image data) associated with the specific user. For example, the placeholder image 234 may be for an image of the specific user (e.g., a picture of Jane Doe). Executing the image patcher function 272 for the specific user (e.g., Jane Doe) replaces the placeholder image 234 with a picture of Jane Doe when the intelligent media renderer 302 renders the modified data structure 212 as customized media content 308 for display on the display device 352 of the computing device 350 of the specific user (e.g., a computing device of Jane Doe).

In some implementations, the image patcher function 272 may automatically handle layout properties for replacement of the placeholder image with an image based on user content based on a size of an image and a size of an area within the media content. In some implementations, the image patcher function 272 may size or otherwise alter (e.g., resize, crop) the image associated with the specific user so that a size of the image does not exceed a size of the area within the media content. For example, referring to FIG. 1, a size of an image associated with a user may exceed the size of the second area 104. In these cases, an image of the user will may not completely fit into the second area 104 without one or more of the sides of the image being truncated or cut-off. In some implementations, the image patcher function 272 may determine that the image associated with the user may not fit into the second area 104 without part(s) of the image being cut-off or truncated. The image patcher function 272 may resize, alter, and/or crop the image so that the entire image may fit into the second area 104. The image patcher function 272 may resize, alter, and/or crop the image such that a target aspect ratio for the image is maintained while focusing on a focal point of the image.

Referring to FIG. 1 and FIG. 2, continuing with the rendering of the modified media data structure 212 for the specific user (e.g., Jane Doe), the intelligent media renderer 302 may continue accessing the data record 306a when rendering the modified reaction layer 264 of the modified media data structure 212 for the specific user (e.g., Jane Doe). The intelligent media renderer 302 may access the reactions patch 268 and execute a reactions patcher function 278 included in the reactions patch 268. Executing the reactions patcher function 278 may replace the placeholder reactions bar 266 in the modified reaction layer 264 with one or more emojis for reactions associated with the specific user. For example, the placeholder reactions bar 266 may include emojis for a thumbs up (e.g., a like reaction), a heart (e.g, a love reaction) and/or a face with a specific expression representative of a reaction (e.g., a wow reaction). Executing the image patcher function 272 for the specific user (e.g., Jane Doe) replaces the placeholder reactions bar 266 with a reactions bar including emojis for reactions most commonly used and/or preferred by the user (e.g., Jane Doe) when the intelligent media renderer 302 renders the modified data structure 212 as customized media content 308 for display on the display device 352 of the computing device 350 of the specific user (e.g., a computing device of Jane Doe).

Referring to FIG. 1 and FIG. 2, continuing with the rendering of the modified media data structure 212 for the specific user (e.g., Jane Doe), the intelligent media renderer 302 may continue accessing the data record 306a when rendering the modified date layer 248 of the modified media data structure 212 for the specific user (e.g., Jane Doe). The intelligent media renderer 302 may access the date patch 252 and execute the date patcher function 274 included in the date patch 252. Executing the date patcher function 274 may replace the placeholder date 250 in the modified date layer 248 with a number of days based on information and/or data associated with the specific user. For example, the placeholder date 250 may be for a number of days between a current date and a future date. The intelligent media renderer 302 may determine a current date by, for example, accessing a calendar application included in the computing device 350 of the specific user. The intelligent media renderer 302 may determine the future date by, for example, accessing a database, repository, or other information source for a date of an event associated with the media content. Executing the date patcher function 274 for the specific user (e.g., Jane Doe) replaces the placeholder date 250 with the number of days between the current date and the future date when the intelligent media renderer 302 renders the modified data structure 212 as customized media content 308 for display on the display device 352 of the computing device 350 of the specific user (e.g., a computing device of Jane Doe).

Referring to FIG. 1 and FIG. 2, continuing with the rendering of the modified media data structure 212 for the specific user (e.g., Jane Doe), the intelligent media renderer 302 may continue accessing the data record 306a when rendering the modified location layer 254 of the modified media data structure 212 for the specific user (e.g., Jane Doe). The intelligent media renderer 302 may access the location patch 258 and execute the location patcher function 276 included in the location patch 258. Executing the location patcher function 276 may replace the placeholder location 256 in the modified location layer 254 with a location associated with the specific user. For example, the placeholder location 256 may be for the city and state where the specific user (e.g., Jane Doe) resides. Executing the location patcher function 276 for the specific user (e.g., Jane Doe) replaces the placeholder location 256 with the residence city and state for Jane Doe when the intelligent media renderer 302 renders the modified data structure 212 as customized media content 308 for display on the display device 352 of the computing device 350 of the specific user (e.g., a computing device of Jane Doe).

In some implementations, a patch may add a feature to a modified layer (e.g., augmenting the layer). In some implementations, a patch may correct a feature in the modified layer. For example, the patcher module 206 may determine that a feature in a layer is incorrect or in error. A patch may be generated to correct the error and may be included in the modified layer. In some implementations, a patch may add at least one key to a layer for use in controlling future recursion of the layer. The modified layer may include the added at least one key.

The examples shown in FIGS. 1, 2, and 3 illustrate a way to customize a video for requesting participation of a user in an event. In general, a personalized video per user would have to be created for rendering for each individual user. This would require a lot of overhead for the creation of each video as well as the mechanisms needed for delivering each video to each individual participant (e.g., storage of each video, etc.). The use of patches allows for the creation of a single video (a single media data structure) that may be modified to include declarative patches and/or full patches in augmented layers resulting in a single modified media data structure for the video where each augmented layer may include a placeholder and a patcher function. When the video is rendered for a particular user, each patcher function is executed, replacing information and data for the particular user in the respective placeholder for the patch.

Referring to FIG. 3, when the intelligent media renderer 302 renders the modified media data structure 212 for another user (e.g., John Smith), the intelligent media renderer 302 may access the user information and data repository 304, and specifically, may access a data record 306b for (associated with) John Smith. The intelligent media renderer 302 may access the text patch 228 and execute the text patcher function 270 replacing the placeholder text 230 in the modified text layer 224 with "John Smith" (the name of the specific user). The intelligent media renderer 302 may access the reactions patch 268 and execute the reactions patcher replacing the placeholder reactions bar 266 with a reactions bar that includes one or more emojis associated with or preferred by John Smith. The intelligent media renderer 302 may access the date patch 252 and execute the date patcher function 274 replacing the placeholder date 250 in the modified image layer 226 with a number of days based on information and/or data associated with John Smith. The intelligent media renderer 302 may access the location patch 258 and execute the location patcher function 276 included in the location patch 258 replacing the placeholder location 256 in the modified location layer 254 with a location associated with John Smith (e.g., an address, a current location of a computing device, etc.).

In some Implementations, when an intelligent media renderer (e.g., the intelligent media renderer 302) renders a modified media data structure (e.g., the modified media data structure 212) for a user, the intelligent media renderer may access a user information and data repository 304 (e.g., the user information and data repository 304) and determine that, when executing a patcher function included in a patch included in a layer of the modified data structure, information and/or data associated with the user may not be available for replacement of the placeholder in the patch that is associated with the patcher function. In some implementations, the patcher function may include logic for removing the layer from the rendering of the modified data structure. In some implementations, the patcher function may include logic for replacing the placeholder in the patch with default information and/or data.

For example, referring to FIGS. 1, 2, and 3, the intelligent media renderer 302 may render the modified media data structure 212 for the user Jim Jones. The intelligent media renderer 302 may determine that, when executing the patcher function included in the date patch 252 included in the modified date layer 248 of the modified media data structure 212, information and/or data associated with the user, Jim Jones, may not be included in a data record 306c for (associated with) Jim Jones for use in replacement of the placeholder date 250. The patcher function included in the date patch 252 may remove the modified date layer 248 from the rendering of the modified media data structure 212. Referring to FIG. 1, the fifth area 116 may not be included in the rendered personalized media content for Jim Jones based on the lack of data for use in the placeholder date 250. In addition, or in the alternative, the intelligent media renderer 302 may determine that, when executing the patcher function included in the reactions patch 268 included in the modified reactions layer 264 of the modified media data structure 212, information and/or data associated with the user, Jim Jones, may not be included in a data record 306c for (associated with) Jim Jones for use in replacement of the placeholder reactions bar 266. The patcher function included in the reactions patch 268 may replace the placeholder reactions bar 266 with a default reactions bar.

Figure 4:
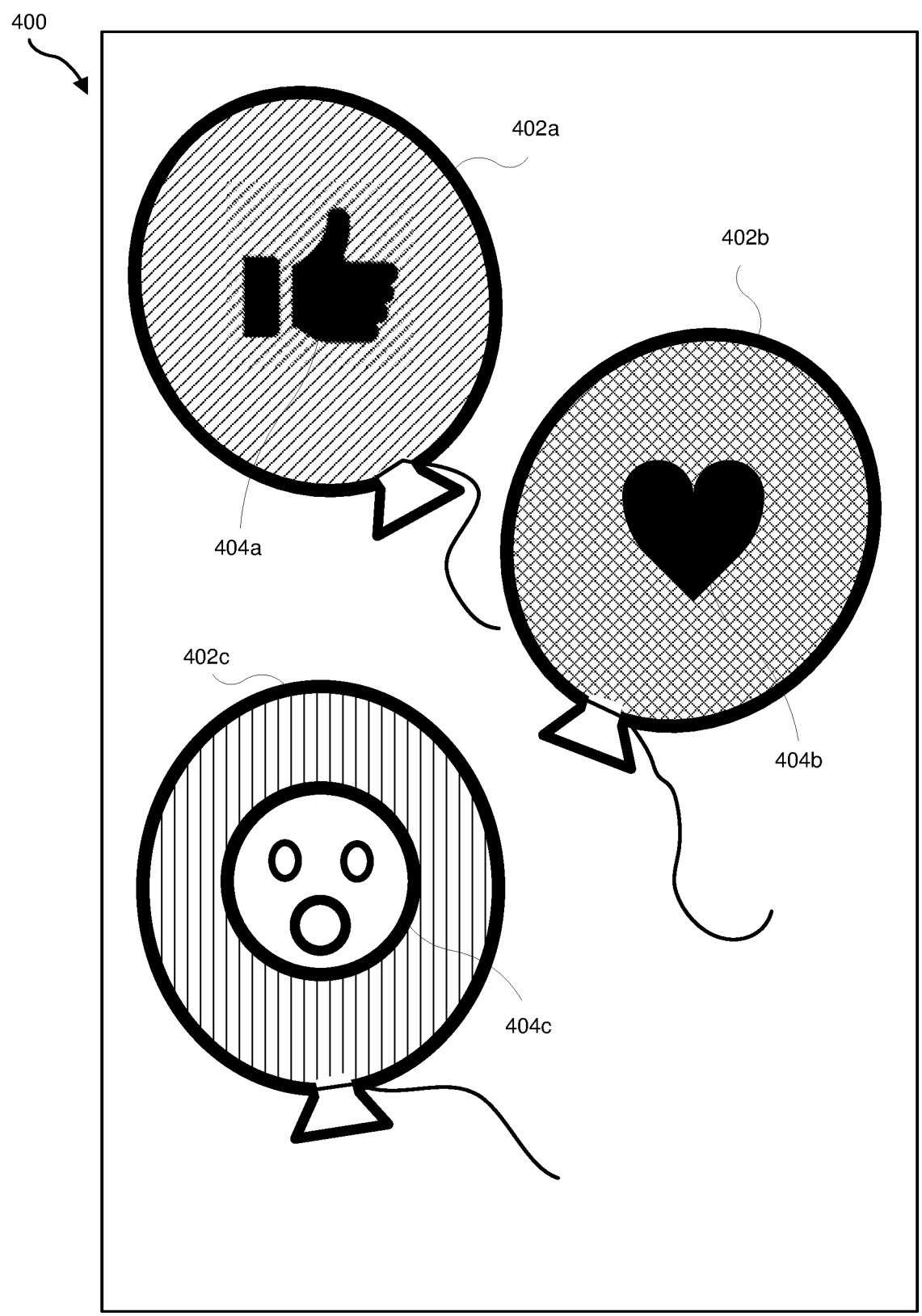
FIG. 4 is a block diagram showing a second example of media content for personalized rendering.

FIG. 4 is a block diagram showing a second example 400 of media content for personalized rendering. For example, the second example 400 may be personalized media content that may be rendered on a display device included in a computing device of a user (e.g., a display device 352 of a computing device 350 as shown with reference to FIG. 3). In some implementations, the second example 400 may be for personalized media content that is a single image. In some implementations, the second example 400 may be for personalized media content that is a frame included in a video.

In the second example 400, each balloon (e.g., each of balloons 402a-c) may include a respective reaction (e.g., reactions 404a-c). One or more full patches may be used to create (generate) the personalized media content included in the second example 400. Each full patch may include a filter function that determines a patch is applicable to each layer in the media content that provides the rendering of each of the balloons 402a-c. A patcher function may be included in a patch for each layer along with a placeholder for the reaction. Combinatorial logic included in each patcher function may determine, at the time of rendering of the image, what reaction may be included in each balloon, conditionally including the determined reaction in each balloon 402a-c. For example, referring to FIG. 4, three reactions (e.g., like (reaction 404a), love (reaction 404b) and wow (reaction 404c)) may be available for applying to the balloons 402a-c, showing the most liked balloon (e.g., balloon 402a), the most loved balloon (e.g., balloon 402b), and the balloon with the greatest wow factor (e.g., balloon 402c).

Full patches may allow personalization of media content where the combinatorial logic for execution by a patcher function included in the patch may be complex. If declarative patches were used in these cases, multiple declarative patches may need to be created to perform the functions of a single full patch. In many cases, the patch may be used once or very few times when personalizing media content. In some implementations, if a full patch and specific combinatorial logic is performed repeatedly (more than once and a notable number of times), the full patch may become a declarative patch. In some implementations, the creating of a declarative patch from (or based on) a full patch may be based on the use of the same patch across multiple original media content. In some implementations, a declarative patch may be created based on a full patch when personalizing a particular original media content.

Figure 5:
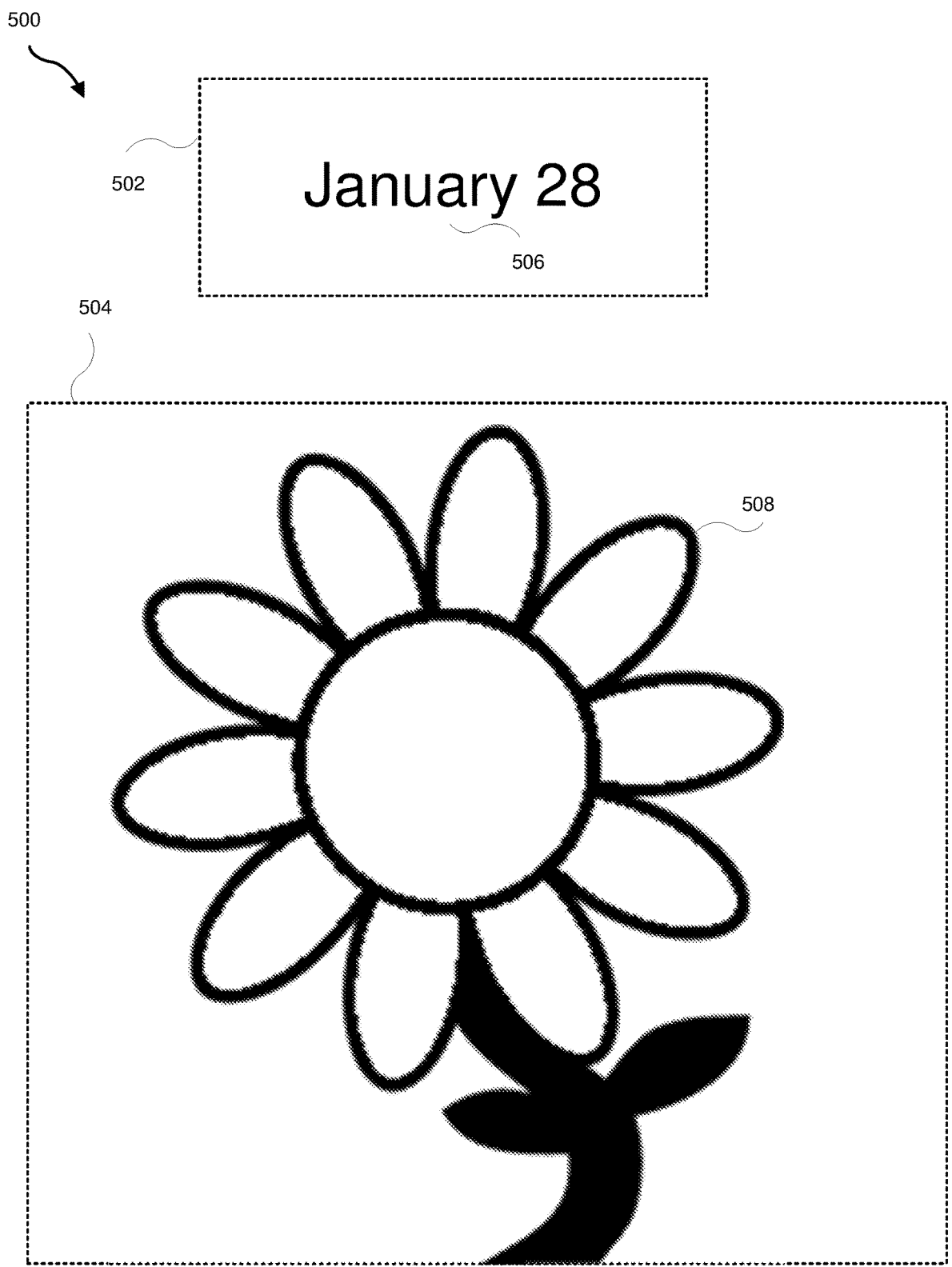
FIG. 5 is a block diagram showing a third example of media content for personalized rendering.

FIG. 5 is a block diagram showing a third example 500 of media content for personalized rendering. For example, the third example 500 may be personalized media content that may be rendered on a display device included in a computing device of a user (e.g., a display device 352 of a computing device 350 as shown with reference to FIG. 3). In some implementations, the third example 500 may be for personalized media content that is a single image. In some implementations, the third example 500 may be for personalized media content that is a frame included in a video.

The third example 500 may be for personalized media content that includes a first entry 506 in a first area 502 of the rendered media content and a second entry 508 in a second area 504 of the rendered media content. For example, the first area 502 and the second area 504 may each be associated with a respective layer in a composition for the media content.

A respective patch may be used to create (generate) the personalized media content included in each of the first area 502 and the second area 504 when rendering the media content. In some implementations, a patch may be a full patch. In some implementations, a patch may be a declarative patch. The personalized media content may be based on content of a user.

The first entry 506 in the first area 502 may be based on a date associated with user content (e.g., a date based on a calendar application executing on the computing device of the user). For example, referring to FIG. 5, the date is "January 28." A modified media data structure for use in rendering the third example 500 of the personalized media content may include a modified text layer associated with the first area 502. The modified text layer may include placeholder text for the first entry 506. In some implementations, a text patch for the text layer may be a full patch that includes a filter function for determining that a patch is applicable to the text layer. The filter function may determine applicability of a patch for the layer based on one or more characteristics of the layer (e.g., it is a text entry based on a date). The text patch may include a patcher function that includes the logic for determining the date, and once the date is determined, the patcher function may include logic for determining the text for replacement of the placeholder text. In some implementations, a text patch for the first text layer may be a declarative patch that includes placeholder text and a patcher function that substitutes the entry "January 28" for the placeholder text.

The second entry 508 in the second area 504 may be also be based on a date associated with user content (e.g., a date based on a calendar application executing on the computing device of the user). For example, referring to FIG. 5, the date is "January 28." January 28 is National Daisy Day. A modified media data structure for use in rendering the third example 500 of the personalized media content may include a modified image layer associated with the second area 504. The modified image layer may include a placeholder image for the second entry 508. The placeholder image may be for an image associated with a national day related to the date. In some implementations, an image patch for the image layer may be a full patch that includes a filter function for determining that a patch is applicable to the image layer. The filter function may determine applicability of a patch for the layer based on one or more characteristics of the layer (e.g., it is an image entry based on a date). The image patch may include a patcher function that includes the logic for determining the date, and once the date is determined, the patcher function may include logic for determining an image representative of the national day associated with the date and for replacement of the placeholder image. In some implementations, an image patch for the image layer may be a declarative patch that includes a placeholder image and a patcher function that substitutes the second entry 508 (e.g., the image of the daisy) for the placeholder image.

Figure 6:
FIG. 6 is a block diagram showing a fourth example of media content for personalized rendering.

FIG. 6 is a block diagram showing a fourth example 600 of media content for personalized rendering. For example, the fourth example 600 may be personalized media content that may that may be rendered on a display device included in a computing device of a user (e.g., a display device 352 of a computing device 350 as shown with reference to FIG. 3). In some implementations, the fourth example 600 may be for personalized media content that is a single image. In some implementations, the fourth example 600 may be for personalized media content that is a frame included in a video. The fourth example 600 shows a version of the personalized media content of the third example 500, with a first entry 606 in the first area 502 being a version of the first entry 506 translated into Hebrew, a language that is written from right to left.

A respective patch may be used to create (generate) the personalized media content included in the first area 502 that includes a text patcher function 270 capable of (configured to) handle text and layout properties for replacement of placeholder text with text based on user content that may include a locale. The text patcher function 270 may, when executed during the rendering of modified media content, replace the placeholder text with a text string that is aligned in a right-to-left manner based on the locale associated with the user. For example, referring to FIG. 3, an intelligent media renderer (e.g., the intelligent media renderer 302) when rendering a modified media data structure (e.g., the modified media data structure 212) for a specific user (e.g., Jane Doe) may access a user information and data repository (e.g., the user information and data repository 304), and specifically, may access the data record for (associated with) the specific user (e.g., data record 306a for Jane Doe) determining a locale of the user. In another example, the intelligent media renderer 302 may determine a locale of the user based on information and/or data included in a computing device (e.g., the computing device 350) of the user. In the case where the locale of the user may indicate the language of the user to be Hebrew, the text alignment for the text string may be in a right-to-left manner in the language of the user.

The first entry 606 in the first area 502 may be based on a date associated with user content (e.g., a date based on a calendar application executing on the computing device of the user). For example, referring to FIG. 5, the date is "January 28." The first entry 606 is the Hebrew translation of "January 28." A modified media data structure for use in rendering the fourth example 600 of the personalized media content may include a modified text layer associated with the first area 502. The modified text layer may include placeholder text for the first entry 606. In some implementations, a text patch for the text layer may be a full patch that includes a filter function for determining that a patch is applicable to the text layer. The filter function may determine applicability of a patch for the layer based on one or more characteristics of the layer (e.g., it is a text entry based on a date). The text patch may include a patcher function that includes the logic for determining the date, and once the date is determined, the patcher function may include logic for determining the text for replacement of the placeholder text. The patcher function may automatically handle the layout properties for the replacement text based on a locale associated with the user.

Figure 7:
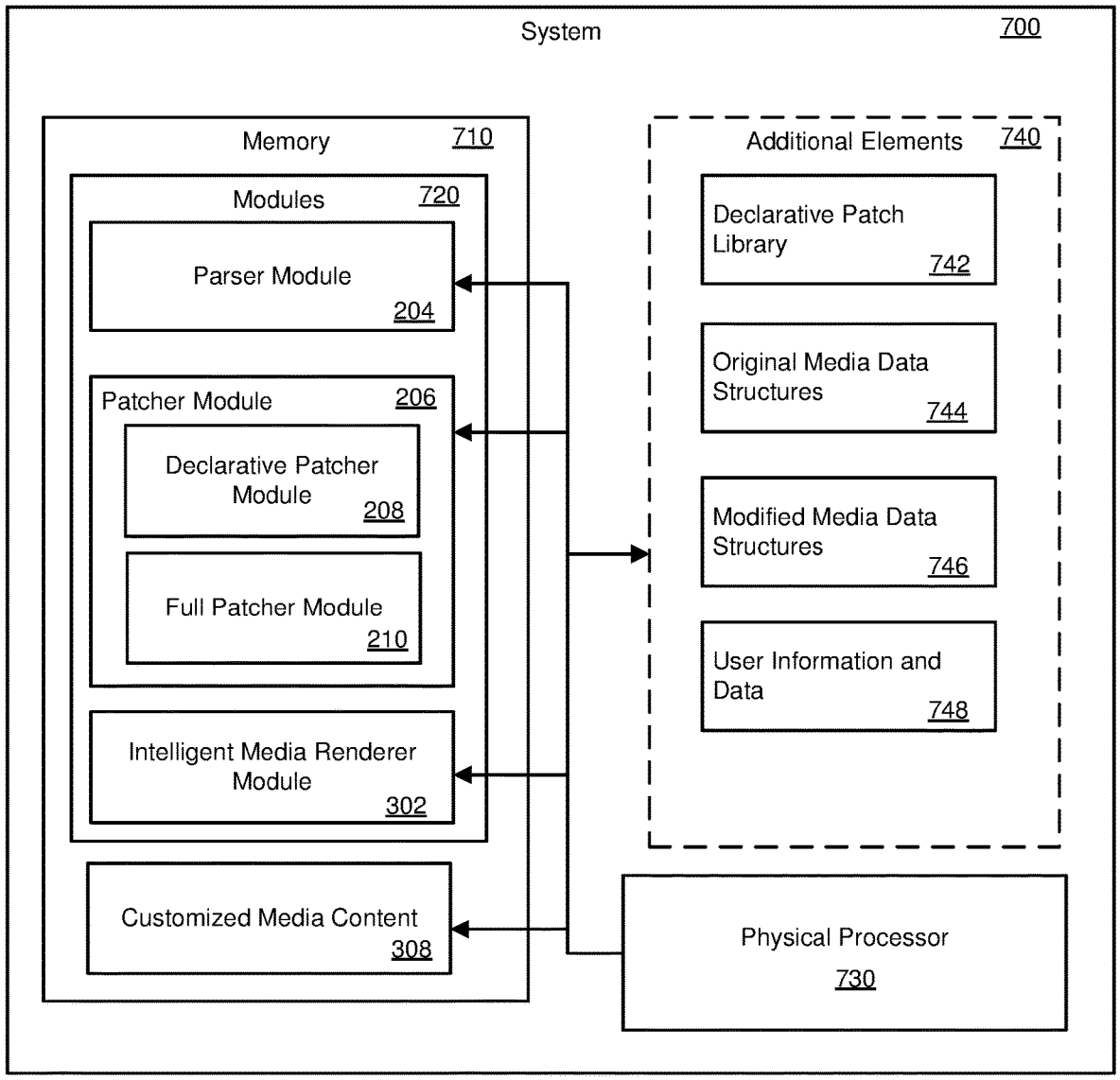
FIG. 7 is a block diagram of an example system that includes modules for use in including patches in an original media data structure when creating a modified media data structure for rendering personalized media content for a user based on user content.

FIG. 7 is a block diagram of an example system 700 that includes modules for use in including patches in an original media data structure when creating a modified media data structure for rendering personalized media content for a user based on user content. Modules 720 may include, referring to FIG. 2 and FIG. 3, the parser module 204, the patcher module 206 which may include the declarative patcher module 208 and the full patcher module 210, and the intelligent media renderer module 302. Although illustrated as separate elements, one or more of modules 720 in FIG. 7 may represent portions of a single module or application.

In certain embodiments, one or more of modules 720 in FIG. 7 may represent one or more software applications or programs that, when executed by a computing device, may cause the computing device to perform one or more tasks. As illustrated in FIG. 7, example system 700 may also include one or more memory devices, such as memory 710. The memory may include, referring to FIG. 3, customized media content 308. Memory 710 generally represents any type or form of volatile or non-volatile storage device or medium capable of storing data and/or computer-readable instructions. In one example, memory 710 may store, load, and/or maintain one or more of modules 720. Examples of memory 710 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 7, example system 700 may also include one or more physical processors, such as physical processor 730. Physical processor 730 generally represents any type or form of hardware-implemented processing unit capable of interpreting and/or executing computer-readable instructions. In one example, physical processor 730 may access and/or modify one or more of modules 720 stored in memory 710. Additionally, or alternatively, physical processor 730 may execute one or more of modules 720. Examples of physical processor 730 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 7, example system 700 may also include one or more additional elements 740. The additional elements 740 generally represent any type or form of hardware and/or software. In one example, physical processor 730 may access and/or modify one or more of the additional elements 740.

The additional elements 740 may be included in one or more repositories. The one or more repositories may be memory (e.g., the memory 710). The one or more repositories may be databases. In some implementations, the additional elements 740 may be included (part of) the system 700. In some implementations, the additional elements 740 may be external to the system 700 and accessible by the system 700. The additional elements 740 may include a declarative patch library 742, an original media data structures repository 744, a modified media data structures repository 746, and a user information and data repository 748.

The declarative patch library 742 may include (store) one or more declarative patches as described herein. The original media data structures repository 744 may include (store) one or more original media data structures (e.g., the original media data structure 202 as shown in FIG. 2). The modified media data structures repository 746 may include (store) one or more modified media data structures (e.g., the modified media data structure 212 as shown in FIG. 2). The user information and data repository 748 may include (store) one or more data records for users. (e.g., the user information and data repository 304 that includes data records 306a-c as shown in FIG. 3).

For example, the parser module 204 may access an original media data structure (e.g., the original media data structure 202) included (stored) in the original media data structures repository 744. The parser module 204 may identify a layer included in the original media data structure. The declarative patcher module 208 included in the patcher module 206 may access the declarative patch library 742 to determine if a declarative patch is available for use with the identified layer. If it is determined that a declarative patch is available for use with the identified layer, the declarative patcher module 208 may modify or augment the identified layer creating (generating) a modified layer for including in a modified media data structure (e.g., the modified media data structure 212) for including (storing) in the modified media data structures repository 746. If it is determined that a declarative patch is not available for use with the identified layer, the full patcher module 210 may determine if a full patch is applicable to the identified layer. If it is determined that a full patch is applicable to the identified layer, the full patcher module 210 may modify, augment, replace, or otherwise change the identified layer creating (generating) a modified layer for including in a modified media data structure (e.g., the modified media data structure 212) for including (storing) in the modified media data structures repository 746. The patcher module 206 may access the user information and data repository 748 when creating a modified layer for including in a modified media data structure in order to personalize the modified media content based on content of a user whose information and data is included in the user information and data repository 748. The intelligent media renderer 302 may access a modified media data structure included in the modified media data structures repository 746 and may access the user information and data repository to obtain information and/or data associated with a user for use in creating (generating) the customized media content 308. The intelligent media renderer 302 may render the customized media content 308 on a display device a computing device of a user (e.g., the display device 352 of the computing device 350).

Figure 8:
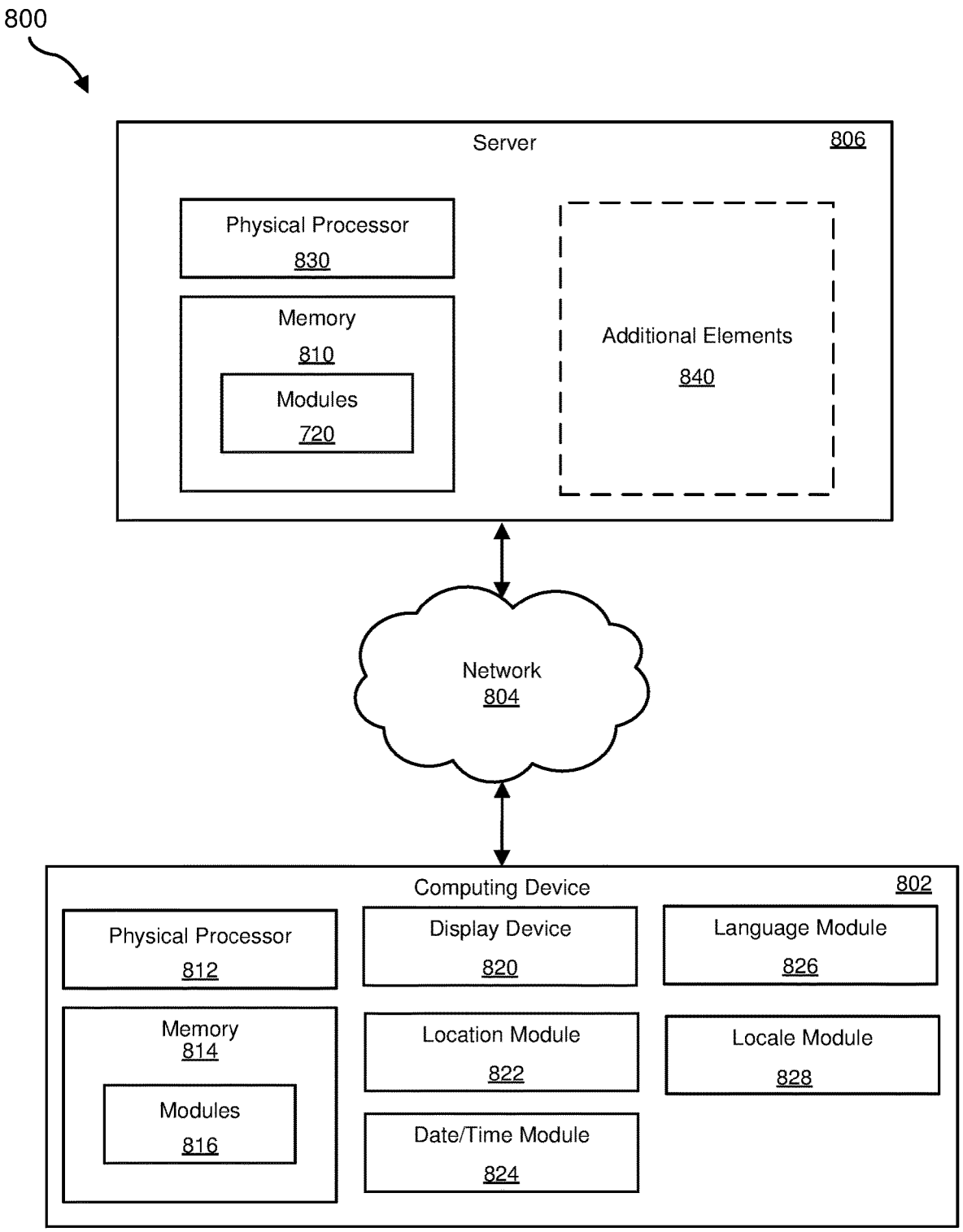
FIG. 8 illustrates an exemplary network environment in which aspects of the present disclosure may be implemented.

FIG. 8 illustrates an exemplary network environment 800 in which aspects of the present disclosure may be implemented. The network environment 800 may include one or more computing devices (e.g., computing device 802), a network 804, and a server 806. In one example, server 806 may host a system for including placeholders in media content or may be part of a system that hosts a system for including placeholders in media content. For example, the server 806 may host all or part of the system 700 as shown in FIG. 7. In this example, the server 806 may include a physical processor 830 that may be one or more general-purpose processors that execute software instructions. The server 806 may include a data storage subsystem that includes a memory 810 which may store software instructions, along with data (e.g., input and/or output data) processed by execution of those instructions. Referring to FIG. 7, the memory 810 may include the modules 720.

The server 806 may include additional elements 840. Referring FIG. 7, the additional elements 840 may include all or part of the additional elements 740. In some implementations, all or part of the additional elements 840 may be external to the server 806 and the computing device 802 and may be accessible by the server 806 either directly (a direct connection) or by way of the network 804.

The computing device 802 may represent a client device or a user device, such a desktop computer, laptop computer, tablet device, smartphone, or other computing device. The computing device 802 may include a physical processor (e.g., physical processor 812), which may represent a single processor or multiple processors, and one or more memory devices (e.g., memory 814), which may store instructions (e.g., software applications) and/or data in one or more modules 816. The modules 816 may store software instructions, along with data (e.g., input and/or output data) processed by execution of those instructions.

The computing device 802 may be (represent) a computing device of a user (e.g., the computing device 350 as shown in FIG. 3). The computing device 802 may include a display device 820, a location module 822, a date/time module 824, a language module 826, and a locale module 828. The display device 820 may display personalized media content to a user of the computing device 802 as described herein. The location module 822 may include hardware and/or software for determining a location of the computing device 802. The location of the computing device 802 may be used to personalize media content for the user of the computing device 802 as described herein. The date/time module 824 may include hardware and/or software for determining a current date and/or a current time. The current date and/or the current time may be used to personalize media content for the user of the computing device 802 as described herein. The language module 826 may include hardware and/or software for determining a language of a user of the computing device 802. The language of the user may be used to personalize media content for the user of the computing device 802 as described herein. The locale module 828 may include hardware and/or software for determining a locale associated with a user of the computing device 802. The locale associated with the user may be used to personalize media content for the user of the computing device 802 as described herein.

The computing device 802 may be communicatively coupled to server 806 through the network 804. The network 804 may be any communication network, such as the Internet, a Wide Area Network (WAN), or a Local Area Network (LAN), and may include various types of communication protocols and physical connections.

As noted, the server 806 may host the system 700, and in such embodiments, the computing device 802 may send (provide) information to the server 806 for use in personalizing media content for a user of the computing device 802.

Figure 9:
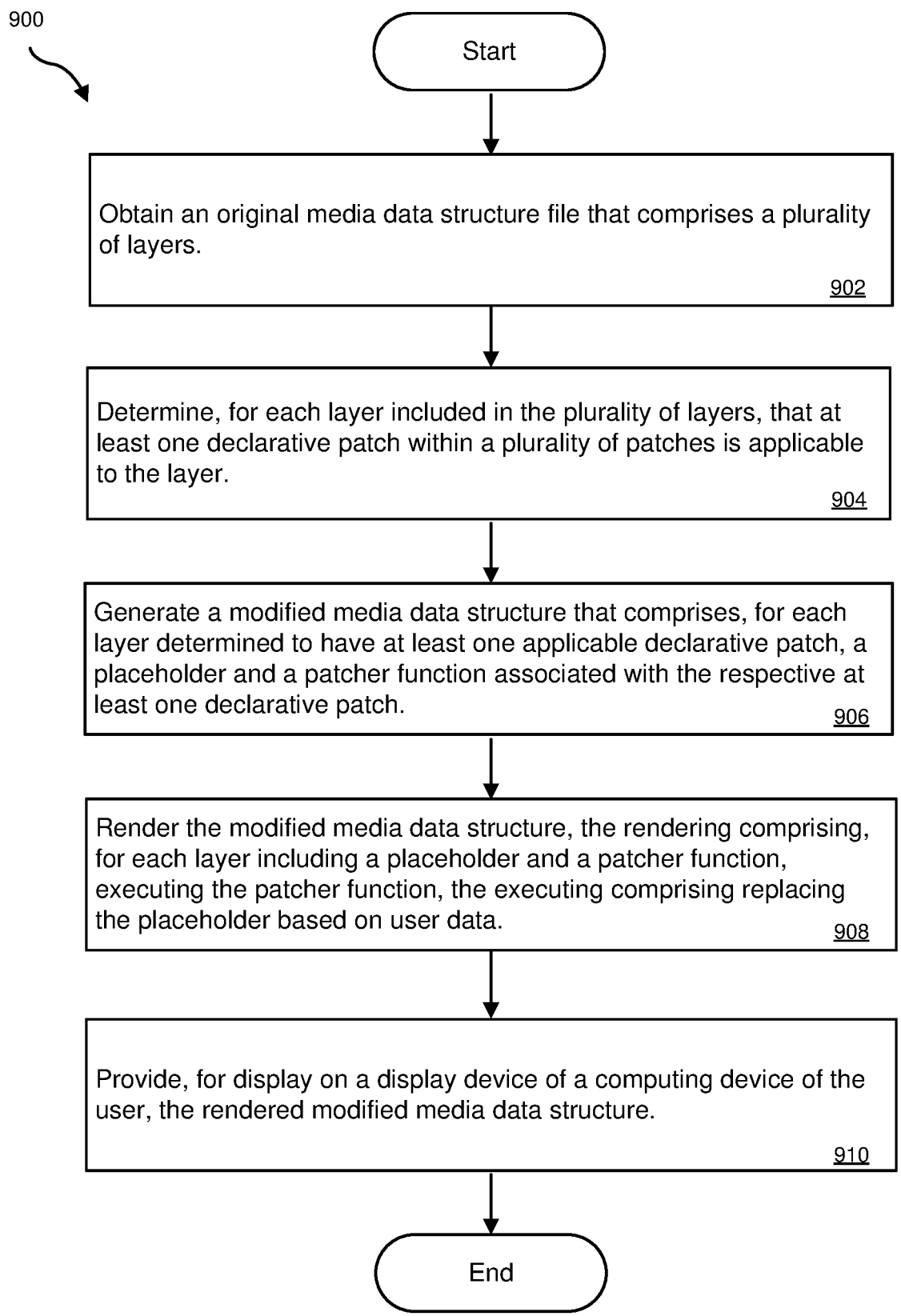
FIG. 9 is a flow diagram of an exemplary computer-implemented method for including placeholders in media content.

FIG. 9 is a flow diagram of an exemplary computer-implemented method 900 for including placeholders in media content. The steps shown in FIG. 9 may be performed by any suitable computer-executable code and/or computing system, including the system(s) illustrated in FIGS. 7 and 8. In one example, each of the steps shown in FIG. 9 may represent an algorithm whose structure includes and/or is represented by multiple sub-steps, examples of which will be provided in greater detail below.

As illustrated in FIG. 9, at step 902 one or more of the systems described herein may obtain an original media data structure that comprises a plurality of layers. For example, referring to FIGS. 2 and 3, the parser module 204 may obtain (receive) the original media data structure 202 that includes the text layer 216, the image layer 218 the location layer, the date layer, the reaction layer 260, and the additional layers 244*a-c*.

The systems described herein may perform step 902 in a variety of ways. In one example, the server 806 may receive original media content represented by the original media data structure 202 from a media content provider that may communicate with the server 806 by way of the network 804. In another example, a database or repository accessible by the server 806 may include the original media data structure 202. In another example, the original media data structure 202 may be stored in the original media data structure repository 744. The parser module 204 may access the original media data structure repository 744 to obtain the original media data structure 202.

As illustrated in FIG. 9, at step 904 one or more of the systems described herein may determine, for each layer within the plurality of layers, that at least one declarative patch within a plurality of declarative patches is applicable to the layer. For example, referring to FIGS. 2 and 3, the declarative patcher module 208 may determine that a text declarative patch (e.g., the text patch 228), and an image declarative patch (e.g., the image patch 232 are applicable to the text layer 216 and the image layer 218, respectively.

The systems described herein may perform step 904 in a variety of ways. In one example, the parser module 204 may identify the text layer 216. The parser module 204 may provide information and data related to the text layer 216 to the patcher module 206. The patcher module 206 may utilized the declarative patcher module 208, which may access the declarative patch library 742 and determine that a declarative text patch (e.g., the text patch 228) is applicable to the text layer 216. In another example, the parser module 204 may identify the image layer 218. The parser module 204 may provide information and data related to the image layer 218 to the patcher module 206. The patcher module 206 may utilized the declarative patcher module 208, which may access the declarative patch library 742 and determine that a declarative image patch (e.g., the image patch 232) is applicable to the image layer 218.

As illustrated in FIG. 9, at step 906 one or more of the systems described herein may generate a modified media data structure that comprises, for each layer determined to have at least one applicable declarative patch, a placeholder and a patcher function associated with the respective at least one declarative patch. For example, referring to FIGS. 2 and 3, the patcher module 206 may generate (or create) the modified media data structure 212 that includes the modified text layer 224 that includes the placeholder text 230 and the text patch 228 including the text patcher function 270. In another example, the patcher module 206 may generate (or create) the modified media data structure 212 that includes the modified image layer 226 that includes the placeholder image 234 and the image patch 232 including the image patcher function 272.

The systems described herein may perform step 906 in a variety of ways. In one example, the declarative patcher module 208 may apply the declarative text patch included in the declarative patch library 742 to the text layer 216 resulting in the modified text layer 224 that includes placeholder text 230 (in place of the user name entry 220) and the text patch 228 that includes the text patcher function 270 that when executed replaces the placeholder text 230 with user content (e.g., a name of the user). In another example, the declarative patcher module 208 may apply the declarative image patch included in the declarative patch library 742 to the image layer 218 resulting in the modified image layer 226 that includes the placeholder image 234 (in place of the user image entry 222) and the image patch 232 that includes the image patcher function 272 that when executed replaces the placeholder image 234 with user content (e.g., an image of the user).

As illustrated in FIG. 9, at step 908 one or more of the systems described herein may render the modified media data structure, the rendering comprising, for each layer including a placeholder and a patcher function, executing the patcher function, the executing comprising replacing the placeholder based on user data. For example, referring to FIGS. 2 and 3, the intelligent media renderer 302 may obtain the modified media data structure 212. The intelligent media renderer 302 may render the modified media data structure 212. The rendering may include accessing the user information and data repository 304, the accessing being for a particular user (e.g., accessing the data record 306a for Jane Doe). The rendering may execute the text patcher function 270, the executing replacing the placeholder text 230 with the name of the user (e.g., Jane Doe). In another example, the rendering may execute the image patcher function 272, the executing replacing the placeholder image 234 with the image of the user (e.g., a picture of Jane Doe).

The systems described herein may perform step 908 in a variety of ways. In one example, the intelligent media renderer 302 may render the modified media data structure 212 using content for a particular user as obtained from the user information and data repository 304 (e.g., content for Jane Doe as obtained from the data record 306a for Jane Doe included in the user information and data repository 304). The intelligent media renderer 302 may render the modified media data structure 212 by executing patcher functions, the patcher function executions replacing respective placeholders within modified layers of the modified media data structure 212. The result of the rendering of the modified media data structure 212 creating (generating) the customized media content 308.

As illustrated in FIG. 9, at step 910 one or more of the systems described herein may provide, for display on a display device of a computing device of the user, the rendered modified media data structure. For example, the intelligent media renderer 302 may provide the customized media content 308 to the computing device 350 of the user for display on the display device 352.

The systems described herein may perform step 910 in a variety of ways. In one example, the intelligent media renderer 302 may provide the customized media content 308 to the computing device 802 of the user for display on the display device 820 by way of the network 804.

Figure 10:
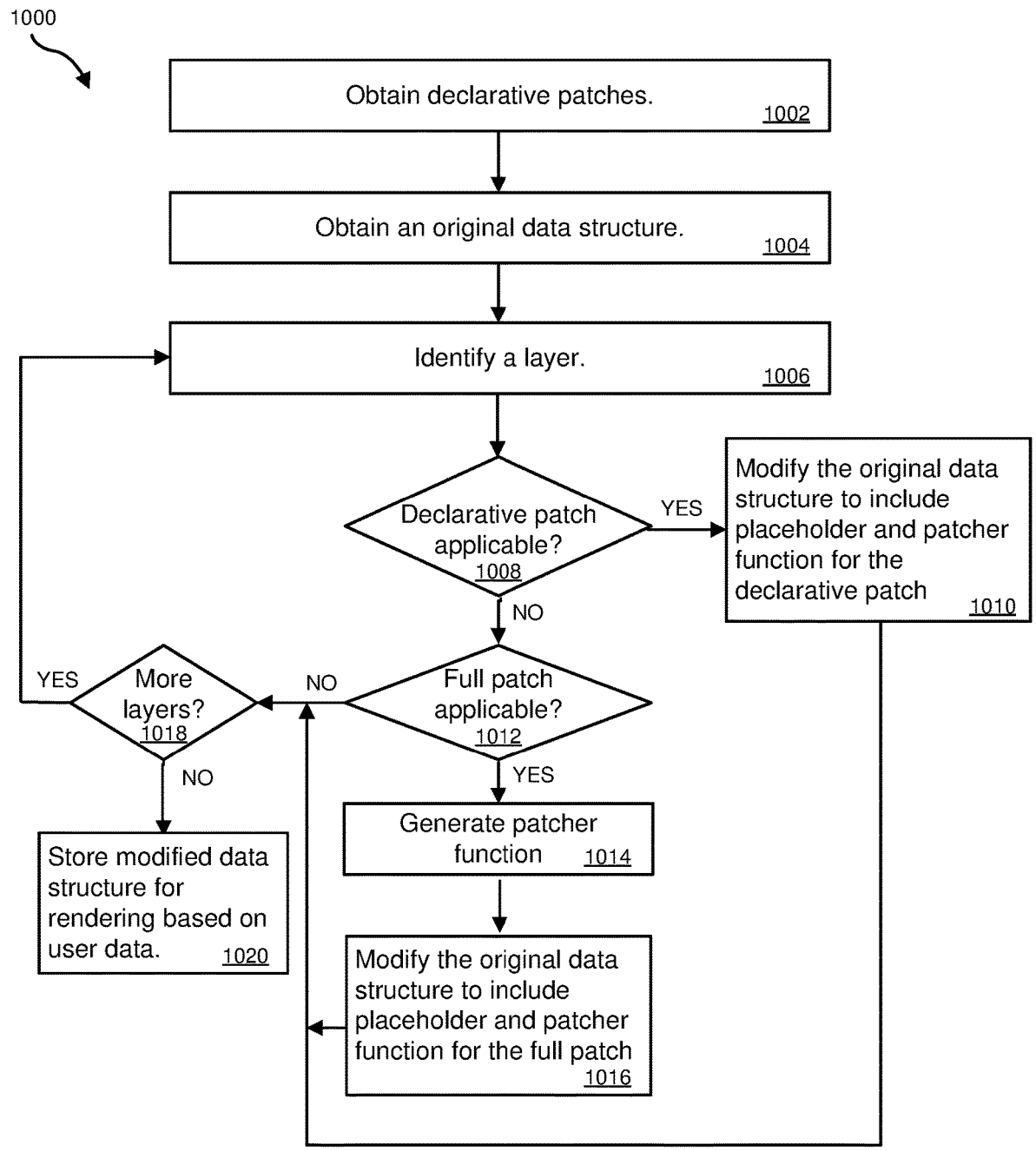
FIG. 10 is a flow diagram of an exemplary computer-implemented method for determining whether to apply a patch to a layer included in a media data structure.

FIG. 10 is a flow diagram of an exemplary computer-implemented method 1000 for determining whether to apply a patch to a layer included in a media data structure. The steps shown in FIG. 10 may be performed by any suitable computer-executable code and/or computing system, including the system(s) illustrated in FIGS. 7 and 8. In one example, each of the steps shown in FIG. 10 may represent an algorithm whose structure includes and/or is represented by multiple sub-steps, examples of which will be provided in greater detail below.

As illustrated in FIG. 10, at step 1002 one or more of the systems described herein may obtain declarative patches. For example, one or more declarative patches may be stored in the declarative patch library 742.

The systems described herein may perform step 1002 in a variety of ways. In one example, developers may create declarative patches on an as needed basis. In some cases, a full patch may become a declarative patch for storage in the declarative patch library 742 as a patch that may be commonly used. In many cases, declarative patches may provide limited functionality as compared to a full patch. In cases, however, where the limited functionality of a patch is frequently used, providing a library of declarative patches reduces the number of full patches that may be needed when generating a modified media data structure. A full patch may be more verbose or complex than a declarative patch, allowing for unlimited functionality for the application of the patch.

As illustrated in FIG. 10, at step 1004 one or more of the systems described herein may obtain an original data structure. For example, the parser module 204 may obtain the original media data structure 202.

The systems described herein may perform step 1004 in a variety of ways. In one example, the server 806 may receive the original media data structure 202 from the original media data structure repository 744. The parser module 204 may access the original media data structure repository 744 to obtain the original media data structure 202.

As illustrated in FIG. 10, at step 1006 one or more of the systems described herein may identify a layer. For example, the parser module 204 may identify a layer included in the original media data structure 202 (e.g., the text layer).

The systems described herein may perform step 1006 in a variety of ways. In one example, referring to FIGS. 2 and 3, the parser module 204 may identify the text layer 216 included in the original media data structure 202.

As illustrated in FIG. 10, at step 1008 one or more of the systems described herein may determine if a declarative patch is applicable to the identified layer. For example, the parser module 204 may provide the identified layer (the code for the identified layer) to the patcher module 206. The declarative patcher module 208 may access the declarative patch library 742 to determine if a declarative patch is available (applicable) to the layer.

The systems described herein may perform step 1008 in a variety of ways. In one example, the declarative patcher module 208 may determine the applicability of a declarative patch for a layer based on, for example, a name of the layer or any other property of the layer.

If it is determined, at step 1008, that a declarative patch is applicable to the identified layer, as illustrated in FIG. 10, at step 1010 one or more of the systems described herein may modify the original data structure to include placeholder and patcher function for the declarative patch. For example, the parser module 204 may provide the text layer 216 (the code for the text layer) to the patcher module 206. The declarative patcher module 208 may access the declarative patch library 742 and determine that a declarative patch is available (applicable) to the text layer 216.

The systems described herein may perform step 1010 in a variety of ways. In one example, the patcher module 206 may generate (or create) the modified text layer 224 that includes the placeholder text 230 and the text patch 228 including the text patcher function 270. The modified text layer 224 may be included in a modified media data structure 212. The modified text layer 224 may augment the text layer 216 by including the placeholder text 230 that may be replaced with content of a user when the modified media data structure 212 is rendered for the user.

If it is determined, at step 1008, that the declarative patch is not applicable to the identified layer, as illustrated in FIG. 10, at step 1012 one or more of the systems described herein may determine if a full patch is applicable to the identified layer. For example, the parser module 204 may provide the layer (the code for the layer) to the patcher module 206. The declarative patcher module 208 may access the declarative patch library 742 and determine that a declarative patch is not available (applicable) to the layer. Next the full patcher module 210 may determine if a patch is available (applicable) to the layer.

The systems described herein may perform step 1012 in a variety of ways. In one example, the full patcher module 210 may determine the applicability of a full patch for a layer based on, for example, a name of the layer or any other property of the layer.

If it is determined, at step 1012, that a full patch is applicable to the identified layer, as illustrated in FIG. 10, at step 1014 one or more of the systems described herein may generate a patcher function. For example, the full patcher module 210 may generate (create) a patcher function for inclusion in the full patch.

The systems described herein may perform step 1014 in a variety of ways. In one example, the parser module 204 may provide the location layer 238 (the code for the location layer) to the patcher module 206. The declarative patcher module 208 may access the declarative patch library 742 and determine that a declarative patch is not available (applicable) to the location layer 238. Next the full patcher module 210 may determine that a full patch is applicable to the location layer 238. A location filter function included in the full patcher module 210 may determine that a full patch is applicable to the location layer 238. The location patcher function 276 associated with the full location layer patch may be determined to be available for use with the location layer 238.

As illustrated in FIG. 10, at step 1016 one or more of the systems described herein may modify the original data structure to include placeholder and patcher function for the full patch. For example, the parser module 204 may provide the location layer 238 (the code for the location layer) to the patcher module 206. A location filter function may be included in (associated with) a location full layer patch that also includes a location patcher function 276.

The systems described herein may perform step 1016 in a variety of ways. In one example, the patcher module 206 may generate (or create) the modified location layer 254 that includes the placeholder location 256 and the location patch 258 including the location patcher function 276. The modified location layer 254 may be included in a modified media data structure 212. The modified location layer 254 may augment the location layer 238 by including the placeholder location 256 that may be replaced with content of a user when the modified media data structure 212 is rendered for the user.

If it is determined, at step 1012, that the full patch is not applicable to the identified layer, as illustrated in FIG. 10, at step 1018 one or more of the systems described herein may determine if there are more layers. Once the original data structure is modified to include the placeholder and the patcher function for the full patch at step 1016, as illustrated in FIG. 10 at step 1018, one or more of the systems described herein may determine if there are more layers. Once the original data structure is modified to include the placeholder and the patcher function for the declarative patch at step 1010, as illustrated in FIG. 10 at step 1018, one or more of the systems described herein may determine if there are more layers. For example, the parser module 204 may parse the original media data structure 202 identifying additional layers with the structure (at step 1006) and proceeding through steps 1008-1018 until there are no further layers.

If it is determined, at step 1018, that there are more layers, as illustrated in FIG. 10, the method 1000 may continue to step 1006, identifying another (a next) layer. If it is determined, at step 1018, that there are no more layers, as illustrated in FIG. 10, at step 1020 one or more of the systems described herein may store the modified data structure for rendering based on user data. For example, the patcher module 206 may store the modified media data structure in a repository.

The systems described herein may perform step 1020 in a variety of ways. In one example, the patcher module 206 may store the modified media data structure 212 in the modified media data structure repository 746.

Example Embodiments

Example 1: A computer-implemented method may include obtaining, by a computing system, an original media data structure that comprises a plurality of layers, determining, by the computing system and for each layer within the plurality of layers, that at least one declarative patch within a plurality of declarative patches is applicable to the layer, generating, by the computer system, a modified media data structure that comprises, for each layer determined to have at least one applicable declarative patch, a placeholder and a patcher function associated with the respective at least one declarative patch, rendering the modified media data structure, the rendering comprising, for each layer including a placeholder and a patcher function, executing the patcher function, the executing comprising replacing the placeholder based on user data, and providing, for display on a display device of a computing device of the user, the rendered modified media data structure.

Example 2: The computer-implemented method of Example 1, wherein the at least one declarative patch comprises a text declarative patch, and replacing the placeholder based on user data comprises replacing placeholder text with textual content related to the user.

Example 3: The computer-implemented method of Examples 1 and 2, wherein replacing the placeholder text with the textual content related to the user comprises translating the textual content related to the user.

Example 4: The computer-implemented method of any of Examples 2 and 3, wherein replacing the placeholder text with the textual content related to the user further comprises accommodating layout properties for the textual content based on a locale.

Example 5: The computer-implemented method of any of Examples 1-4, wherein the at least one declarative patch comprises an image declarative patch, and wherein replacing the placeholder based on user data comprises replacing a placeholder image with image content related to the user.

Example 6: The computer-implemented method of Example 5, wherein the placeholder image comprises a target area having an aspect ratio, and wherein executing the patcher function further comprises modifying the image content related to the user when replacing the placeholder image with the image content, the modifying cropping the image content for placement in the target area at the aspect ratio.

Example 7: The computer-implemented method of any of Examples 1-6, wherein the at least one declarative patch comprises a reactions declarative patch, and wherein replacing the placeholder based on user data comprises replacing a layer with a structure for use in rendering a reactions bar from content related to a user.

Example 8: The computer-implemented method of any of Examples 1-7, wherein generating the modified media data structure further comprises, for each layer determined not to have at least one applicable declarative patch, a filter function and a full patcher function, and wherein rendering the modified media data structure further comprises, for each layer including a filter function and a full patcher function.

Example 9: The computer-implemented method of Example 8, wherein executing the full patcher function comprises augmenting the layer to include user related content.

Example 10: The computer-implemented method of Example 8, wherein executing the full patcher function comprises replacing the layer with user related content.

Example 11: The computer-implemented method of Example 8, wherein executing the full patcher function comprises modifying the layer to respond to content related to the user.

Example 12: The computer-implemented method of Example 8, wherein executing the full patcher function comprises removing the layer from the modified media data structure based on determining that data for use by the layer is not available.

Example 13: The computer-implemented method of Example 8, wherein executing the full patcher function comprises adding at least one feature to the layer.

Example 14: The computer-implemented method of Example 8, wherein executing the full patcher function comprises correcting at least one feature included in the layer.

Example 15: The computer-implemented method of Example 8, wherein executing the full patcher function comprises adding at least one key to the layer for use in controlling future recursion of the layer.

Example 16: A system may include at least one physical processor, and physical memory comprising computer-executable instructions that, when executed by the physical processor, cause the physical processor to:obtain an original media data structure that comprises a plurality of layers, determine, for each layer within the plurality of layers, that at least one declarative patch within a plurality of declarative patches is applicable to the layer, generate a modified media data structure that comprises, for each layer determined to have at least one applicable declarative patch, a placeholder and a patcher function associated with the respective at least one declarative patch, render the modified media data structure, the rendering comprising, for each layer including a placeholder and a patcher function, executing the patcher function, the executing comprising replacing the placeholder based on user data, and provide, for display on a display device of a computing device of the user, the rendered modified media data structure.

Example 17: The system of Example 16, wherein the at least one declarative patch comprises a text declarative patch, and wherein replacing the placeholder based on user data comprises replacing placeholder text with textual content related to the user.

Example 18: The system of Examples 16 and 17, wherein the at least one declarative patch comprises an image declarative patch, and wherein replacing the placeholder based on user data includes comprises a placeholder image with image content related to the user.

Example 19: The system of Examples 16-18, wherein the at least one declarative patch comprises a reactions declarative patch, and wherein replacing the placeholder based on user data comprises replacing the layer with a structure for use in rendering a reactions bar from content related to a user.

Example 20: A non-transitory computer-readable medium comprising one or more computer-executable instructions that, when executed by at least one processor of a computing system, cause the computing system to: obtain an original media data structure that comprises a plurality of layers, determine, for each layer within the plurality of layers, that at least one declarative patch within a plurality of declarative patches is applicable to the layer, generate a modified media data structure that comprises, for each layer determined to have at least one applicable declarative patch, a placeholder and a patcher function associated with the respective at least one declarative patch, render the modified media data structure, the rendering comprising, for each layer including a placeholder and a patcher function, executing the patcher function, the executing comprising replacing the placeholder based on user data, and provide, for display on a display device of a computing device of the user, the rendered modified media data structure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an original media data structure to be transformed, transform the original media data structure, output a result of the transformation to generate a modified media data structure, use the result of the transformation to be used when rendering the media data structure for a user, and store the result of the transformation to a repository for rendering by an intelligent media renderer that will provide a personalized version of the media content to a computing device of a user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAZ disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    parsing, by a computing system, an original media data structure that comprises a plurality of layers including a first layer and a second layer;
    determining, by the computing system, that a declarative patch within a plurality of declarative patches is applicable to the first layer, and that the plurality of declarative patches are not applicable to the second layer;
    determining, by the computing system, that a full patch is applicable to the second layer based on a filter function included in the full patch;
    generating, by the computing system, a modified media data structure that comprises:
        a modified version of the first layer that includes a placeholder and a patcher function associated with the declarative patch; and
        a modified version of the second layer that includes a full patcher function associated with the full patch;
    rendering the modified media data structure, the rendering comprising:

executing the patcher function, the executing replacing the placeholder based on user data;

executing the full patcher function; and providing, for display on a display device of a computing device of a user, the rendered modified media data structure.

2. The computer-implemented method of claim 1,
wherein the declarative patch comprises a text declarative patch; and
wherein replacing the placeholder based on user data comprises replacing placeholder text with textual content related to the user.

3. The computer-implemented method of claim 2, wherein replacing the placeholder text with the textual content related to the user comprises translating the textual content related to the user.

4. The computer-implemented method of claim 3, wherein replacing the placeholder text with the textual content related to the user further comprises accommodating layout properties for the textual content based on a locale.

5. The computer-implemented method of claim 1,
wherein the declarative patch comprises an image declarative patch; and
wherein replacing the placeholder based on user data comprises replacing a placeholder image with image content related to the user.

6. The computer-implemented method of claim 5,
wherein the placeholder image comprises a target area having an aspect ratio; and
wherein executing the patcher function further comprises modifying the image content related to the user when replacing the placeholder image with the image content, the modifying cropping the image content for placement in the target area at the aspect ratio.

7. The computer-implemented method of claim 1,
wherein the declarative patch comprises a reactions declarative patch; and
wherein replacing the placeholder based on user data comprises replacing the first layer with a structure for use in rendering a reactions bar from content related to the user.

8. The computer-implemented method of claim 1, wherein executing the full patcher function comprises augmenting the second layer to include user related content.

9. The computer-implemented method of claim 1, wherein executing the full patcher function comprises replacing the second layer with user related content.

10. The computer-implemented method of claim 1, wherein executing the full patcher function comprises modifying the second layer to respond to content related to the user.

11. The computer-implemented method of claim 1, wherein executing the full patcher function comprises removing the second layer from the modified media data structure based on determining that data for use by the second layer is not available.

12. The computer-implemented method of claim 1, wherein executing the full patcher function comprises adding at least one feature to the second layer.

13. The computer-implemented method of claim 1, wherein executing the full patcher function comprises correcting at least one feature included in the second layer.

14. The computer-implemented method of claim 1, wherein executing the full patcher function comprises adding at least one key to the second layer for use in controlling future recursion of the second layer.

15. A system comprising:
at least one physical processor; and
physical memory comprising computer-executable instructions that, when executed by the physical processor, cause the physical processor to:
parse an original media data structure that comprises a plurality of layers including a first layer and a second layer;
determine that a declarative patch within a plurality of declarative patches is applicable to the first layer, and that the plurality of declarative patches are not applicable to the second layer;
determine that a full patch is applicable to the second layer based on a filter function included in the full patch;
generate a modified media data structure that comprises:
a modified version of the first layer that includes a placeholder and a patcher function associated with the declarative patch; and
a modified version of the second layer that includes a full patcher function associated with the full patch;
render the modified media data structure, the rendering comprising:
executing the patcher function, the executing replacing the placeholder based on user data; and
executing the full patcher function; and
provide, for display on a display device of a computing device of a user, the rendered modified media data structure.

16. The system of claim 15,
wherein the declarative patch comprises a text declarative patch; and
wherein replacing the placeholder based on user data comprises replacing placeholder text with textual content related to the user.

17. The system of claim 15,
wherein the declarative patch comprises an image declarative patch; and
wherein replacing the placeholder based on user data includes comprises a placeholder image with image content related to the user.

18. The system of claim 15,
wherein the declarative patch comprises a reactions declarative patch; and
wherein replacing the placeholder based on user data comprises replacing the first layer with a structure for use in rendering a reactions bar from content related to the user.

19. The system of claim 15, wherein executing the full patcher function comprises augmenting the second layer to include user related content.

20. A non-transitory computer-readable medium comprising one or more computer-executable instructions that, when executed by at least one processor of a computing system, cause the computing system to:
parse an original media data structure that comprises a plurality of layers including a first layer and a second layer;
determine that a declarative patch within a plurality of declarative patches is applicable to the first layer, and that the plurality of declarative patches are not applicable to the second layer;
determine that a full patch is applicable to the second layer based on a filter function included in the full patch;

generate a modified media data structure that comprises:
- a modified version of the first layer that includes a placeholder and a patcher function associated with the declarative patch; and
- a modified version of the second layer that includes a full patcher function associated with the full patch;

render the modified media data structure, the rendering comprising:
- executing the patcher function, the executing replacing the placeholder based on user data; and
- executing the full patcher function; and provide, for display on a display device of a computing device of a user, the rendered modified media data structure.

\* \* \* \* \*

UNITED STATES PATENT AND TRADEMARK OFFICE
CERTIFICATE OF CORRECTION

PATENT NO. : 10,897,440 B1
APPLICATION NO. : 16/546511
DATED : January 19, 2021
INVENTOR(S) : Benjamin Jaffe and Michael O'Brien Page 1 of 1

It is certified that error appears in the above-identified patent and that said Letters Patent is hereby corrected as shown below:

In the Claims

In Column 25, Line 2, Claim 1, delete "user data;" and insert -- user data; and --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*